US009980301B2

(12) United States Patent
Itaya et al.

(10) Patent No.: US 9,980,301 B2
(45) Date of Patent: May 22, 2018

(54) TERMINAL DEVICE, COMMUNICATION METHOD, AND COMMUNICATION SYSTEM (71) Applicant: Sony Corporation, Tokyo (JP)

(72) Inventors: Natsuki Itaya, Tokyo (JP); Katsutoshi Itoh, Tokyo (JP); Hideyuki Suzuki, Tokyo (JP); Yoshihiko Ikenaga, Tokyo (JP); Kimiya Kato, Tokyo (JP); Erika Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/387,386

(22) PCT Filed: Mar. 22, 2013

(86) PCT No.: PCT/JP2013/058220
§ 371 (c)(1),
(2) Date: Sep. 23, 2014

(87) PCT Pub. No.: WO2013/146565
PCT Pub. Date: Oct. 3, 2013

(65) Prior Publication Data
US 2015/0050956 A1 Feb. 19, 2015

(30) Foreign Application Priority Data

Mar. 30, 2012 (JP) ................. 2012-082535

(51) Int. Cl.
H04B 7/00 (2006.01)
H04W 76/02 (2009.01)
(Continued)

(52) U.S. Cl.
CPC ........... *H04W 76/021* (2013.01); *H04W 4/08* (2013.01); *H04W 76/002* (2013.01); *H04W 76/025* (2013.01)

(58) Field of Classification Search
CPC ... H04W 4/08; H04W 76/002; H04W 76/021; H04W 76/025
(Continued)

(56) References Cited

U.S. PATENT DOCUMENTS 7,554,979 B2 6/2009 Ikeda
8,570,942 B2 10/2013 Iwata
(Continued)

FOREIGN PATENT DOCUMENTS

EP 1906684 A1 4/2008
JP 11-196029 A 7/1999
(Continued)

OTHER PUBLICATIONS

Japanese Office Action dated Sep. 3, 2015 in patent application No. 2014507810.
(Continued)

*Primary Examiner* — Raj Chakraborty
(74) *Attorney, Agent, or Firm* — Chip Law Group (57) ABSTRACT The present disclosure relates to a terminal device, a communication method, a program, and a communication system, which can enable one-on-many wireless communication among terminal devices with less trouble for the user. A communication system according to the present disclosure is a communication system in which one parent device and a plurality of child devices perform one-on-many wireless communication. The parent device includes a management unit which manages group information representing a group made up of two or more child devices to which a child device belongs, and a child device connecting unit which establishes wireless connection with the child device which performs notification of the group information that matches the managed group information, and consecutively establishes wireless connections with a plurality of child devices.

(Continued)

On the other hand, the child device includes a notifying unit which notifies the parent device of group information representing a group made up of two or more child devices, to which it itself belongs, and a parent device connecting unit which establishes wireless connection with the parent device in response to a predetermined trigger. The present disclosure can be applied to a system which distributes data by one-on-many wireless communication.

16 Claims, 7 Drawing Sheets

(51) Int. Cl.
*H04W 4/08* (2009.01)
*H04W 76/00* (2018.01)

(58) Field of Classification Search
USPC .......................................................... 455/518
See application file for complete search history.

(56) References Cited

U.S. PATENT DOCUMENTS

| | | | |
|---|---|---|---|
| 2003/0119540 A1 | 6/2003 | Mathis | |
| 2006/0154598 A1* | 7/2006 | Rudland | H04L 12/185 455/3.01 |
| 2007/0189216 A1* | 8/2007 | Wang | H04W 36/12 370/331 |
| 2008/0057992 A1* | 3/2008 | Griffin | H04W 4/08 455/518 |
| 2012/0004003 A1* | 1/2012 | Shaheen | H04W 4/005 455/509 |
| 2012/0147777 A1 | 6/2012 | Arashin et al. | |
| 2012/0163324 A1 | 6/2012 | Arashin et al. | |
| 2012/0275444 A1* | 11/2012 | Shahsavari | H04L 63/0876 370/338 |

FOREIGN PATENT DOCUMENTS

| | | |
|---|---|---|
| JP | 2006246433 A | 9/2006 |
| JP | 2007312202 A | 11/2007 |
| JP | 2008283590 A | 11/2008 |
| JP | 2012-034072 A | 2/2012 |
| WO | 2009016800 A1 | 2/2009 |
| WO | 2011161951 A1 | 12/2011 |

OTHER PUBLICATIONS

Extended European Search Report dated Sep. 30, 2015 in patent application No. 13769471.7.
International Search Report from Internatioal Publication PCT/JP2013/058220 dated May 14, 2013.

* cited by examiner

TERMINAL DEVICE, COMMUNICATION METHOD, AND COMMUNICATION SYSTEM

CROSS-REFERENCE TO RELATED APPLICATION

The present application is a national phase entry under 35 U.S.C. § 371 of International Application No. PCT/JP2013/058220 filed Mar. 22, 2013, published on Oct. 3, 2013 as WO 2013/146565 A1, which claims priority from Japanese Patent Application No. JP 2012-082535, filed in the Japanese Patent Office on Mar. 30, 2012.

TECHNICAL FIELD

The present disclosure relates to a terminal device, a communication method, a program, and a communication system, and relates to a terminal device, a communication method, a program, and a communication system suitably used in a case where one terminal device simultaneously wirelessly connects to multiple terminal devices.

BACKGROUND ART

The Wi-Fi Alliance, which is a group promoting wireless LAN typified by Wi-Fi, has standardized a specification called Wi-Fi Direct, enabling terminal devices to directly perform wireless communication with each other, without having to go through an access point. Wi-Fi Direct enables, in addition to one-on-one wireless communication between terminal devices, one-on-many wireless communication where one terminal device is a parent device and other multiple terminal devices are child devices.

However, in order to perform one-on-many wireless communication among terminal devices, individual connections between the one parent device and many child devices need to be established beforehand. Moreover, in order to establish individual connections between the parent device and the child devices, a user must perform predetermined operations at each of the parent device and child device (e.g., pressing a WPS (Wi-Fi Protected Setup) button (e.g., see PTL 1).

CITATION LIST

Patent Literature

PTL 1: Japanese Unexamined Patent Application Publication No. 2008-283590

SUMMARY OF INVENTION

Technical Problem

Accordingly, the user will perform the predetermined operation time after time before the one-on-many wireless communication between the one parent device and many child devices is started.

The present disclosure has been made in light of this situation, and it is an object thereof to enable one-on-many wireless communication among terminal devices with less trouble for the user.

Solution to Problem

A terminal device according to a first aspect of the present disclosure is a terminal device operating as a parent device in a case where one parent device and a plurality of child devices perform one-on-many wireless communication. The terminal device includes: a management unit which manages group information representing a group made up of two or more child devices to which a child device belongs; and a child device connecting unit which establishes wireless connection with the child device which performs notification of the group information that matches the managed group information, and consecutively establishes wireless connections with a plurality of child devices.

The child device connecting unit may further establish wireless connection with a child device with which a wireless connection has not been established, in response to a predetermined trigger, and the management unit may manage the group information notified from the child device with which wireless connection has been established.

The child device connecting unit may establish wireless connection with a child device with which a wireless connection has not been established, with a predetermined operation by a user as to the parent device and the child device as the predetermined trigger.

The management unit may notify the group information managed thereby by wireless communication, as an object for connection.

At least one of Device Name, Model Name, and Serial Number may be appropriated in the group information.

The group information may be notified having been included in Probe Request, Probe Response, or Beacon Frame.

A communication method according to the first aspect of the present disclosure is a communication method of a terminal device operating as a parent device in a case where one parent device and a plurality of child devices perform one-on-many wireless communication. The terminal device performs: a management step to manage group information representing a group made up of two or more child devices to which a child device belongs; and a child device connecting step to establish wireless connection with the child device which performs notification of the group information that matches the managed group information, and consecutively establish wireless connections with a plurality of child devices.

A program according to the first aspect of the present disclosure is a program, causing a computer operating as a parent device, in a case where one parent device and a plurality of child devices perform one-on-many wireless communication, to function as: a management unit which manages group information representing a group made up of two or more child devices to which a child device belongs; and a child device connecting unit which establishes wireless connection with the child device which performs notification of the group information that matches the managed group information, and consecutively establishes wireless connections with a plurality of child devices.

According to the first aspect of the present disclosure, group information representing a group made up of two or more child devices to which a child device belongs is managed, wireless connection is established with the child device which performs notification of the group information that matches the managed group information, and wireless connections are consecutively established with a plurality of child devices.

A terminal device according to a second aspect of the present disclosure is a terminal device operating as a child device in a case where one parent device and a plurality of child devices perform one-on-many wireless communication. The terminal device includes: a notifying unit which notifies the parent device of group information representing a group made up of two or more child devices, to which it itself belongs; and a parent device connecting unit which establishes wireless connection with the parent device in response to a predetermined trigger.

The parent device connecting unit may establish wireless connection with the parent device, with a predetermined operation by a user as to the parent device and the child device as the predetermined trigger.

The parent device connecting unit may establish wireless connection with the parent device, with group information notified from the parent device as an object of connection matching group information representing the group to which it itself belongs, as the predetermined trigger.

The group information may be user-changeable.

A communication method according to the second aspect of the present disclosure is a communication method of a terminal device operating as a child device in a case where one parent device and a plurality of child devices perform one-on-many wireless communication. The terminal device performs: a notifying step to notify the parent device of group information representing a group made up of two or more child devices, to which it itself belongs; and a parent device connecting step to establish wireless connection with the parent device in response to a predetermined trigger.

A program according to the second aspect of the present disclosure is a program, causing a computer operating as a child device, in a case where one parent device and a plurality of child devices perform one-on-many wireless communication, to function as: a notifying unit which notifies the parent device of group information representing a group made up of two or more child devices, to which it itself belongs; and a parent device connecting unit which establishes wireless connection with the parent device in response to a predetermined trigger.

In the second aspect of the present disclosure, the parent device is notified of group information representing a group made up of two or more child devices, to which it itself belongs, and wireless connection is established with the parent device in response to a predetermined trigger.

A communication system according to a third aspect of the present disclosure is a communication system in which one parent device and a plurality of child devices perform one-on-many wireless communication. The parent device includes a management unit which manages group information representing a group made up of two or more child devices to which a child device belongs, and a child device connecting unit which establishes wireless connection with the child device which performs notification of the group information that matches the managed group information, and consecutively establishes wireless connections with a plurality of child devices. The child device includes a notifying unit which notifies the parent device of group information representing a group made up of two or more child devices, to which it itself belongs, and a parent device connecting unit which establishes wireless connection with the parent device in response to a predetermined trigger, thereby consecutively establishing wireless connection with a plurality of child devices.

In the third aspect of the present disclosure, a child device notifies the parent device of group information representing a group made up of two or more child devices to which it itself belongs, and the parent device manages the group information representing the group made up of two or more child devices to which the child device belongs. Wireless connection is established between the parent device and child device regarding which the managed group information and notified group information match, and wireless connections are consecutively establishes with a plurality of child devices.

Advantageous Effects of Invention

According to the first aspect of the present disclosure, wireless connection can be established with multiple child devices, without causing trouble for the user.

According to the second aspect of the present disclosure, wireless connection can be established with the parent device, without causing trouble for the user.

According to the third aspect of the present disclosure, wireless connection can be established between a parent device and many child devices which perform one-on-many wireless communication, without causing trouble for the user.

DESCRIPTION OF EMBODIMENTS

A preferred embodiment for carrying out the present disclosure (hereinafter referred to as embodiment) will be described in detail with reference to the drawings.

[Configuration Example of Home Theater System]

Figure 1:
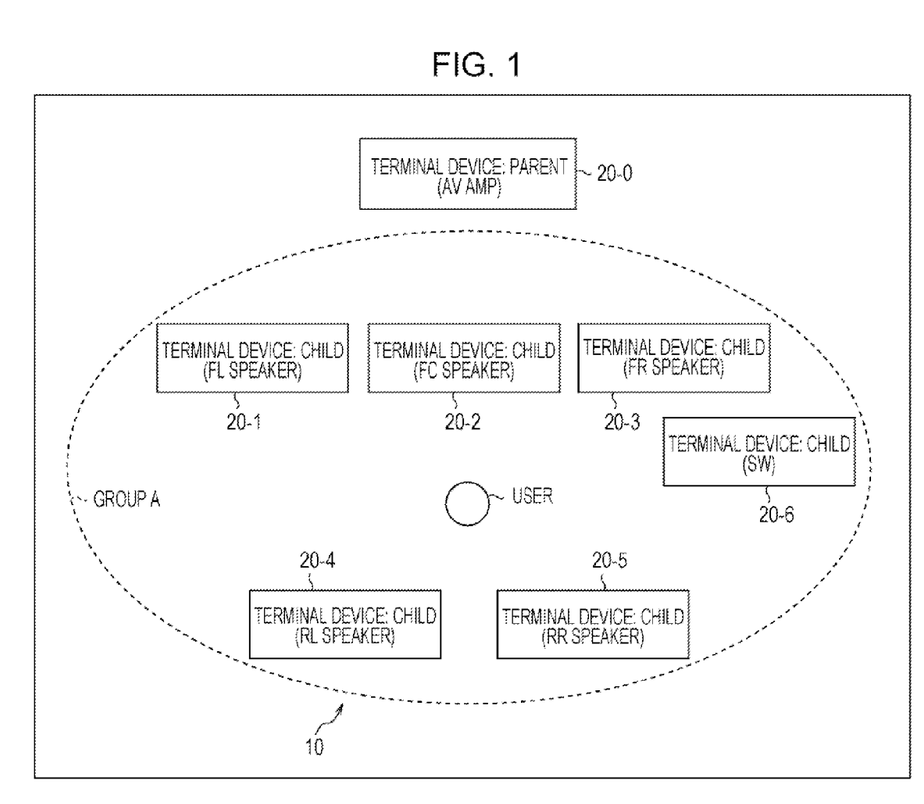
FIG. 1 is a configuration diagram of a home theater system to which the present disclosure has been applied.

FIG. 1 illustrates a configuration example of a distribution system according to the present disclosure as an embodiment applied to a home theater system made up of one AV amplifier and six speakers for 5.1 channels worth.

This home theater system 10 is such that one AV amplifier transmits audio signals by one-on-many wireless connection to six speakers belonging to group A, so as to output audio from the speakers.

The AV amplifier and the speakers have a terminal device 20, which performs wireless communication, built in. That is to say, the AV amplifier has a terminal device 20-0 which operates as a parent device, built in. A front left speaker, front center speaker, front right speaker, rear left speaker, rear right speaker, and sub-woofer each have terminal devices 20-1 through 20-6, which each operate as child devices, built in.

Hereinafter, in cases where there is not need to individually distinguish the terminal devices 20-0 through 20-6, these will be simply referred to as terminal device 20.

[Configuration Example of Terminal Device 20]

Figure 2:
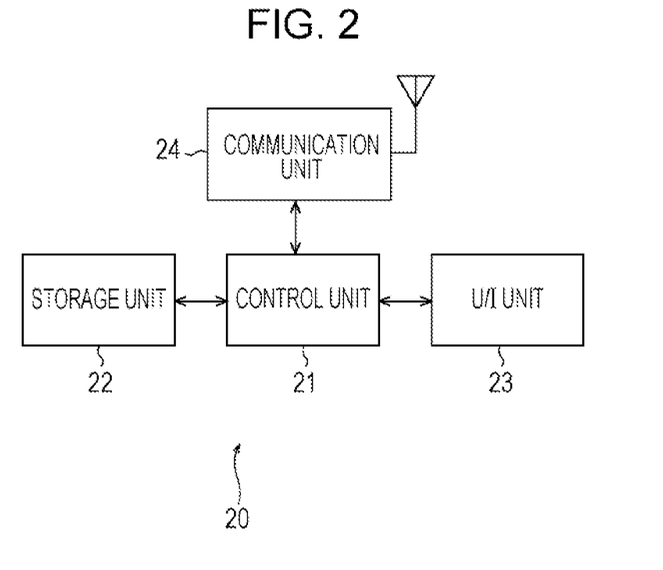
FIG. 2 is a block diagram illustrating a configuration example of a terminal device.

FIG. 2 illustrates a configuration example of a terminal device 20. The terminal device 20 includes a control unit 21, a storage unit 22, a U/I (user interface) unit 23, and a communication unit 24.

The control unit 21 controls the entire terminal device 20 by executing a control program stored in the storage unit 22, thereby realizing the functional blocks of a parent device or a child device. The storage unit 22 stores control programs and various types of information, and stores key used for encryption of wireless communication.

The U/I unit 23 is made up of an input device which the user uses for operation input, and an output device for presenting information to the user. Various types of buttons, such as a WPS button for example, are provided to the input device. A display or the like is included in the output device. The communication unit 24 performs wireless communication with other terminal devices 20 under control of the control unit 21.

[Configuration Example of Functional Blocks of Terminal Device 20 Serving as Parent Device]

Figure 3:
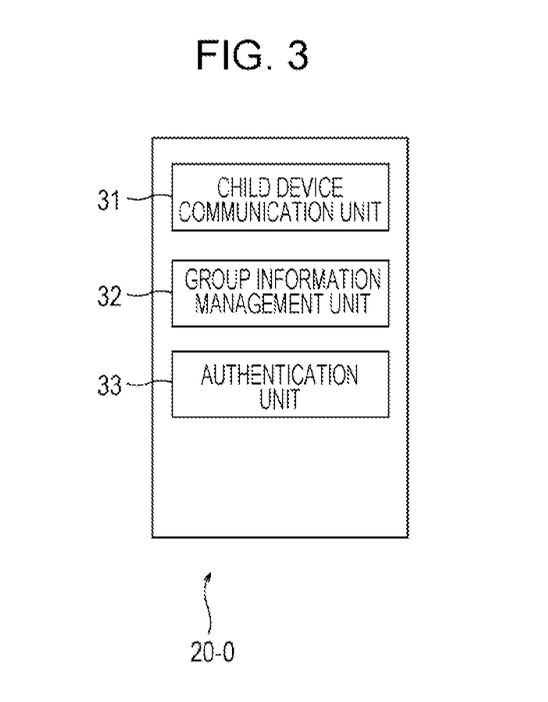
FIG. 3 is a functional block configuration diagram of a terminal device serving as a parent device.

FIG. 3 illustrates a configuration example of a function block of a terminal device 20 serving as a parent device (the terminal device 20-0 built into the AV amplifier in FIG. 1).

A child device communication unit 31 performs wireless communication with child devices. A group information management unit 32 manages group information notified from child devices. This group information includes a group ID representing the group to which the child devices belong. An authentication unit 33 performs authentication processing with a child device regarding which authentication processing has not been performed, based on group information notified from a child device.

[Configuration Example of Functional Blocks of Terminal Device 20 Serving as Child Device]

Figure 4:
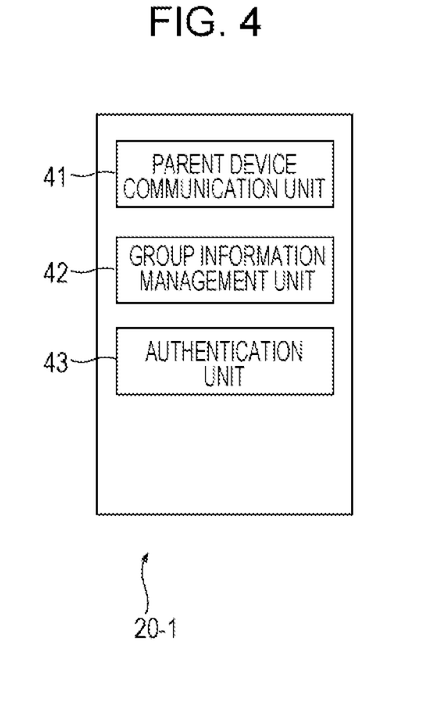
FIG. 4 is a functional block configuration diagram of a terminal device serving as a child device.

FIG. 4 illustrates a configuration example of a function block of a terminal device 20 serving as a child device (the terminal device 20-1 built into the front left speaker in FIG. 1, for example).

A parent device communication unit 41 performs wireless communication with a parent device. A group information management unit 42 holds group information including a group ID, representing the group to which it belongs. The group information may be set beforehand when shipping from the factory, or may be set or changed by the user. An authentication unit 43 performs authentication processing with the parent device.

[About Establishing Connection Between Parent Device and Child Devices]

Next, three types of methods at the time of the parent device establishing connection individually with the child devices will be described with reference to FIG. 5 through FIG. 7.

Figure 5:
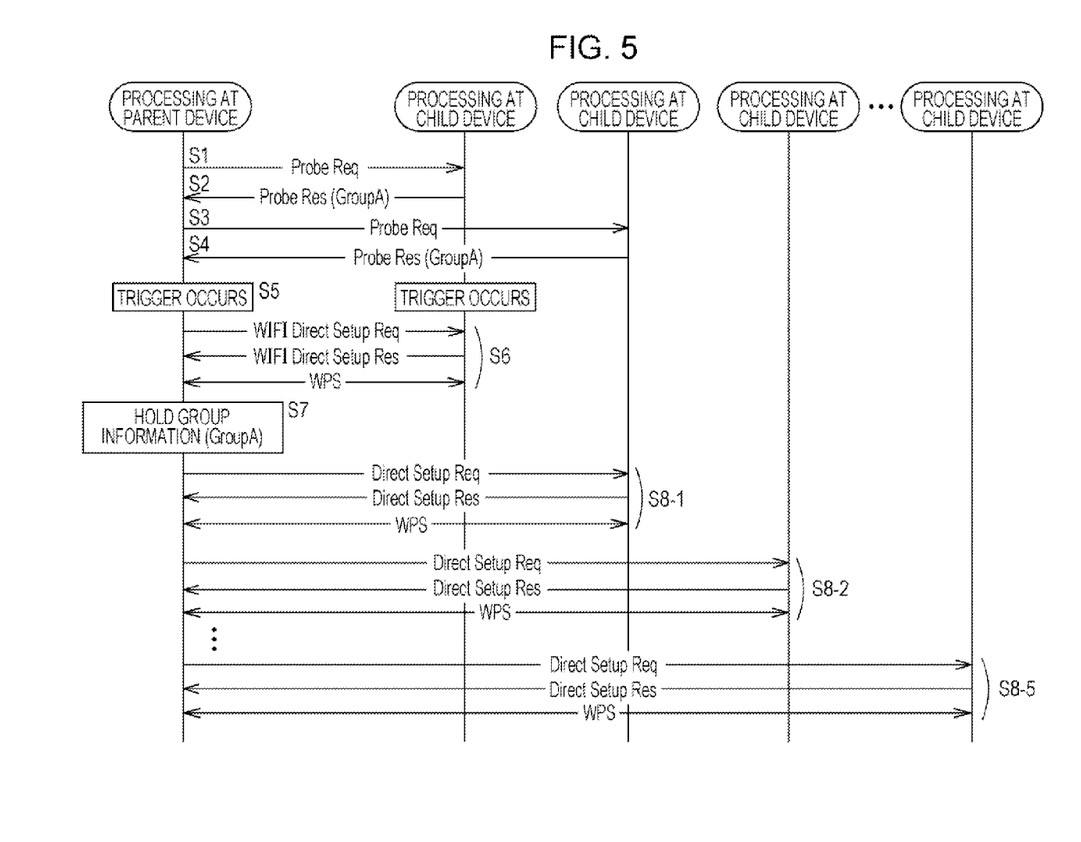
FIG. 5 is a timing chart illustrating first connection establishing processing.

FIG. 5 is a timing chart for describing a first type of method at the time of the parent device establishing connection individually with the child devices (hereinafter, referred to as first connection establishing processing).

Note that as a prerequisite for the first connection establishing processing, assumption will be made that each group information management units 42 of all child devices terminal devices 20-1 through 20-6) manage common group information representing a group A to which they belong.

First, the parent device repeatedly transmits a Probe Request for searching for child device, for a predetermined amount of time. That is to say, in step S1, upon the parent device transmitting a Probe Request to search for a child device capable of wireless communication, the child device which has received the Probe Request transmits a Probe Response including group information including the group ID representing the group to which it belongs (step S2).

Upon the parent device transmitting a Probe Request again (step S3), the child device which has received the Probe Request transmits a Probe Response including group information including the group ID representing the group to which it belongs (step S4). Thus, the parent device can discover child devices situated around itself. While not illustrated, there is a possibility that there are child devices which the parent device has not yet discovered, so a Probe Request may be periodically transmitted to search for child devices.

Now in step S5, for example if the user presses the WPS button of the parent device and also presses the WPS button of one of the multiple child devices, so as to generate a wireless connection establishing trigger, in step S6, Wi-Fi Direct setup is performed between the parent device and one child device, and a secure wireless connection is established after authentication processing. The group information is notified from the child device to the parent device through establishing this wireless connection.

In step S7, group information notified from the child device after connection has been established in step S6, or group information already notified at an opportunity such as step S2 or step S4, is managed by the parent device in the group information management unit 32.

Thereafter, the parent device sequentially transmits a Direct setup request to other child devices emitting the same group information as the child device with which connection has been established, authentication processing is performed, and secure wireless connections are established (steps S8-1 through S8-5, etc.).

According to the first connection establishing processing described above, all that is necessary is for the user to generate a trigger at the parent device and one child device, and wireless communications can be consecutively established between the parent device and multiple child devices.

[Modification of Group Information]

Note however, that In a case where the group information is only group ID=A, simply representing the group A to which the child device belongs, the parent device which has established connection with one child device cannot determine how many more child devices remain for it to establish connection with.

First Modification

Accordingly, serial Nos. within the group are added to the group information which the child devices notify to the parent device. For example, a child device (terminal device 20-1) notifies group ID=A1 as group information, and a child device (terminal device 20-2) notifies group ID=A2 as group information. Thus, in a case where there is a child device partway through the serial Nos. regarding which connection has not been established, the parent device can detect this. Further, the user can be notified to the effect that there is a child device regarding which connection has not be established, prompting the user to bring it near to the parent device.

Second Modification

Further, the total number of child devices belonging to the group is added. For example, a child device (terminal device 20-1) notifies group ID=A1/6 as group information, and a child device (terminal device 20-2) notifies group ID=A2/6 as group information. Thus, the parent device can determine whether or not there are any child devices regarding which connection has not been established.

Third Modification

The serial Nos. are omitted, and just the total number of child devices belonging to the group is added. For example, all child devices (terminal devices 20-1 through 20-6) would notify group ID=A/6 as group information. In this way as well, the parent device can determine whether or not there are any child devices regarding which connection has not been established.

Fourth Modification

An arrangement may be made where the child devices hold a list describing child devices belonging to the group (e.g., a list identifying the child devices by MAC addresses) as the group information, and the child device which first establishes connection with the parent device notifies the list of child devices to the parent device as group information. Thus, the parent device can determined the child devices with which connection should be established.

While the group information has been described above as being included in the Probe Response transmitted from the child device to the parent device, this may be included in a Probe Request transmitted from the child device. Also, the Device Name, Model Name, or Serial Number of a Beacon Frame may be used as group information. Further, a Vendor Specific field which can be provided to a Probe Request, Probe Response, or Beacon Frame, may be defined as a field to describe group information, and group information may be notified using this field.

Figure 6:
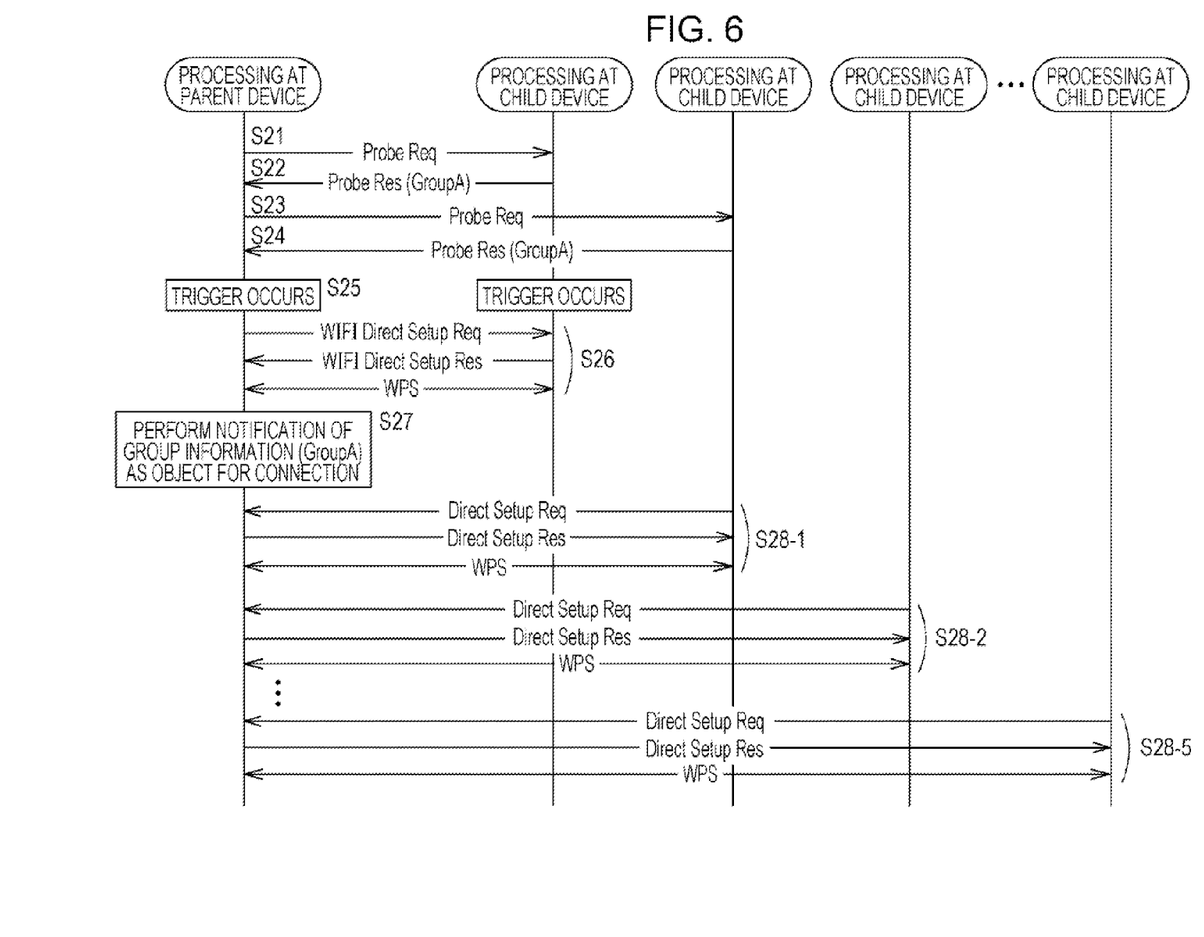
FIG. 6 is a timing chart illustrating second connection establishing processing.

FIG. 6 is a timing chart for describing a second type of method at the time of the parent device establishing connection individually with the child devices (hereinafter, referred to as second connection establishing processing). This second connection establishing processing differs from the above-described first connection establishing processing in that a Direct setup request is transmitted from the child device side (later-described step S28 and thereafter) whereas the Direct setup request had been transmitted from the parent device side in the processing of step S8 and thereafter in the first connection establishing processing.

Note that as a prerequisite for the second connection establishing processing, assumption will be made that each group information management units 42 of all child devices (terminal devices 20-1 through 20-6) manage common group information representing a group A to which they belong.

First, in Step S21, upon the parent device transmitting a Probe Request to search for a child device capable of wireless communication, the child device which has received the Probe Request transmits a Probe Response including group information including the group ID representing the group to which it belongs (step S22).

Upon the parent device transmitting a Probe Request again (step S23), the child device which has received the Probe Request transmits a Probe Response including group information including the group ID representing the group to which it belongs (step S24).

Now in step S25, for example if the user presses the WPS button of the parent device and also presses the WPS button of one of the multiple child devices, so as to generate a wireless connection establishing trigger, in step S26 Wi-Fi Direct setup is performed between the parent device and one child device, and a secure wireless connection is established after authentication processing. The group information is notified from the child device to the parent device through establishing this wireless connection.

In step S27, group information notified from the child device after connection has been established in step S26, or group information already notified at an opportunity such as step S22 or step S24, is managed by the parent device in the group information management unit 32, and also the group information is notified wirelessly as a group to which itself (the parent device) is the object of connection. For example, this wireless notification is performed by transmitting a beacon signal by broadcasting.

Child devices which receive this group information notification, and which this matches the group information managed in itself but have not established connection with the parent device, transmit a Direct setup request and perform authentication processing with the parent device, thereby establishing a secure wireless connection (steps S28-1 through 28-5, and so forth).

According to the second connection establishing processing described above, all that is necessary is for the user to generate a trigger at the parent device and one child device, and wireless communications can be consecutively established between the parent device and multiple child devices.

Modifications of group information and changes to description positions thereof are the same as with the first connection establishing processing, so description thereof will be omitted.

Figure 7:
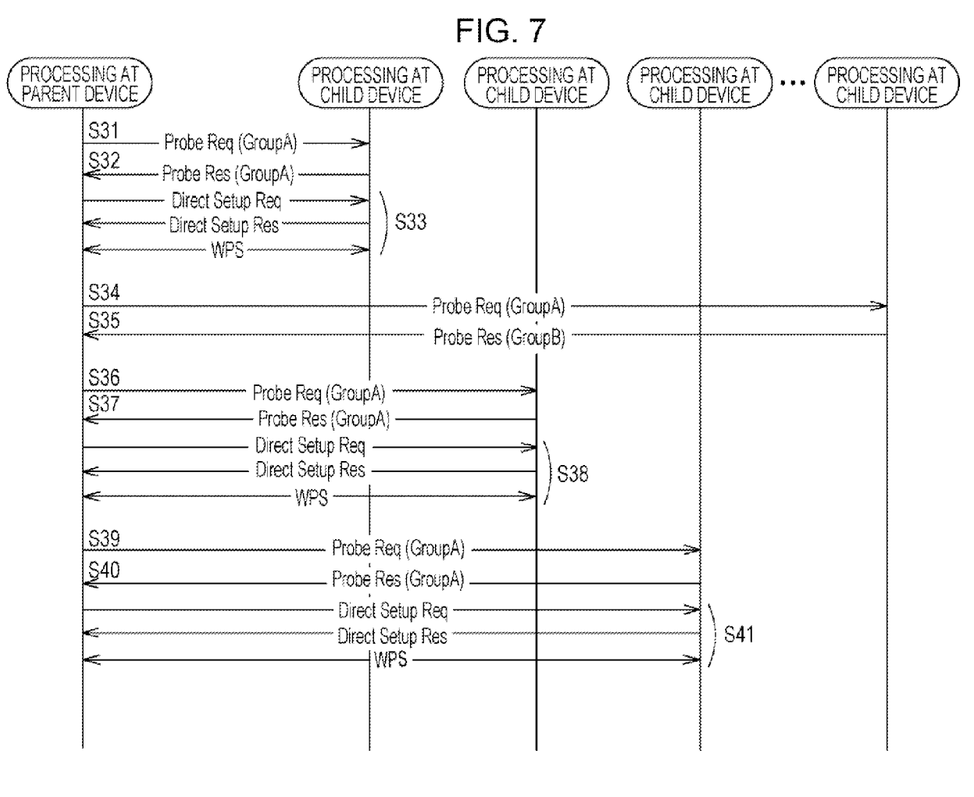
FIG. 7 is a timing chart illustrating third connection establishing processing.

Next, FIG. 7 is a timing chart for describing a third type of method at the time of the parent device establishing connection individually with the child devices (hereinafter, referred to as third connection establishing processing).

Note that as a prerequisite for the third connection establishing processing, assumption will be made that each group information management units 42 of all child devices (terminal devices 20-1 through 20-6) manage common group information representing a group A to which they belong. Also, the parent device (terminal device 20-0) already comprehends the group of child devices with which it should establish connection (group A in this case). Such information can be set in each device when shipping from the factory.

In step S31, upon the parent device transmitting a Probe Request including group information representing a group to which a child device belongs, to search for a child device to which communication should be established, the child device which has received the Probe Request transmits a Probe Response including group information including the group ID representing the group to which it belongs (step S32).

In a case where the group information transmitted form the child device matches the group information which it has transmitted, the parent device transmits a Direct setup request to that child device, performs authentication processing, and establishes a secure wireless connection (step S33 and so forth).

The processing of steps S36 through S38, and steps S39 through S41 are the same, and each time wireless connection establishing processing between the parent device and one child device ends, transmission of a Probe Request including group information is performed, and wireless connections are established with each child device.

Note that in a case where group information transmitted from the child device does not match the group information which it has transmitted (the case of steps S34 and S35), the parent device disregards that child device (no wireless connection is established).

According to the third connection establishing processing described above, the parent device can establish wireless communication triggered by detecting a child device of which the group information matches. Accordingly, in the case of the third connection establishing processing, wireless communications can be consecutively established between the parent device and multiple child devices as long as the child devices to establish wireless communication with are within a communicable range, without the user having to generate a trigger.

Note that the parent device is described above as transmitting a Probe Request including group information representing the group to which the child devices belong, the group information does not have to be included in the Probe Request. That is to say, it is sufficient for the parent device to simply comprehend the group information.

Modifications of group information and changes to description positions thereof are the same as with the first connection establishing processing, so description thereof will be omitted.

Note that the present disclosure is applicable to all sorts of systems where data is transmitted by one-on-many from a parent device to multiple child devices, besides the home theater system 10 which is the present embodiment.

Now, the series of processing of parent device or child device described above may be carried out by hardware, or may be carried out by software. In a case of carrying out the series of processing by software, a program which configures that software is installed in a computer. Computers here include computers built into dedicated hardware, general-purpose personal computers, for example, which can execute various types of functions by installing various types of programs therein, and so forth.

Figure 8:
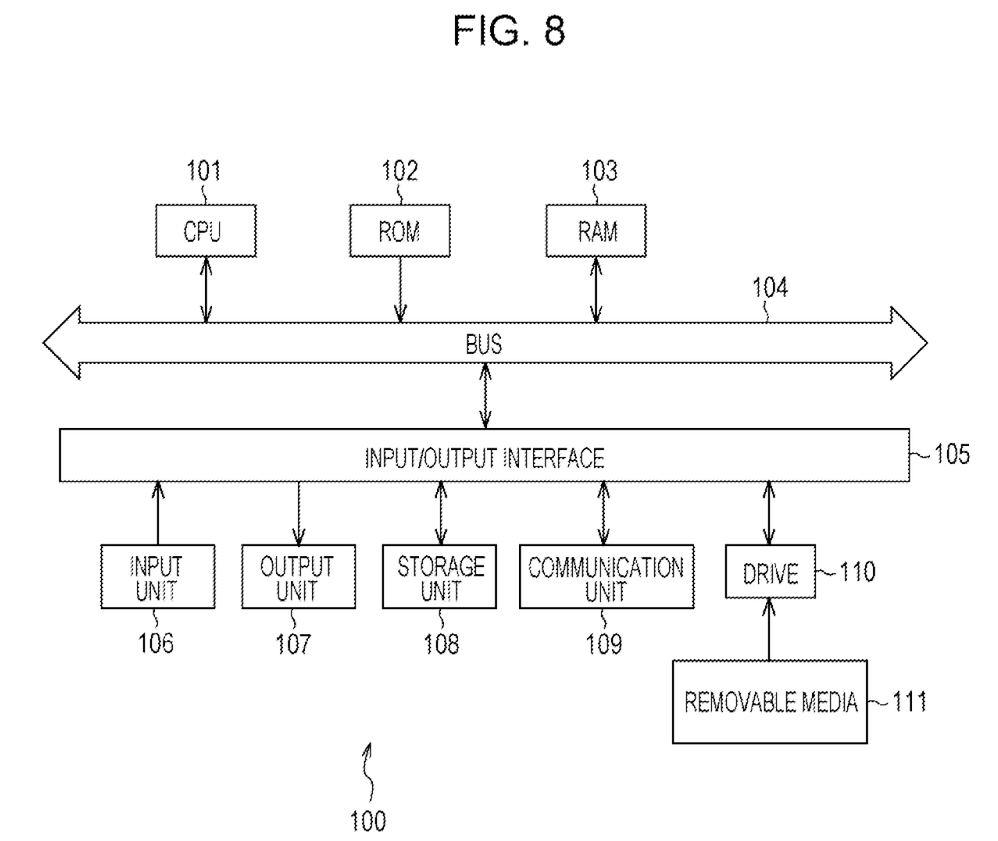
FIG. 8 is a block diagram illustrating a configuration example of a computer.

FIG. 8 is a block diagram illustrating a hardware configuration example of a computer which executes the above-described series of processing by a program.

In the computer 100, a CPU (Central Processing Unit) 101, ROM (Read Only Memory) 102, and RAM (Random Access Memory) 103 are mutually connected by a bus 104.

The bus 104 is further connected to an input/output interface 105. Connected to the input/output interface 105 are an input unit 106, output unit 107, storage unit 108, communication unit 109, and drive 110.

The input unit 106 is made up of a keyboard, mouse, microphone, or the like. The output unit 107 is made up of a display, speaker, or the like. The storage unit 108 is made up of a hard disk, non-volatile memory, or the like. The communication unit 109 is made up of a network interface or the like. The drive 110 drives a removable media 111 such as a magnetic disk, optical disc, magneto-optical disc, or semiconductor memory or the like.

In the computer 100 configured as described above, the CPU 101 loads a program stored in the storage unit 108 for example, to the RAM 103 via the input/output interface 105 and bus 104, and executes the program, whereby the above-described series of processing is performed.

Note that the program which the computer 100 executes may be a program wherein processing is performed in time-sequence following the order described in the present specification, or may be a program where processing is performed in parallel, or at a necessary timing such as when called up.

Note that embodiments of the present disclosure are not restricted to the above-described embodiment, and that various modifications may be made without departing from essence of the present disclosure.

REFERENCE SIGNS LIST 10 home theater system
20 terminal device
21 control unit
22 storage unit
23 U/I unit
24 communication unit
31 child device communication unit
32 group information management unit
33 authentication unit
41 parent device communication unit
42 group information management unit
43 authentication unit

The invention claimed is:

1. A terminal device, comprising:
a central processing unit (CPU) configured to:
transmit a probe request, to search at least two child devices of a plurality of child devices, for a time period,
wherein the plurality of child devices and the terminal device that operates as a parent device communicate by wireless communication;
manage first group information that represents a group, wherein the group comprises the at least two-child devices to which a first child device belongs;
establish a direct wireless connection with the first child device,
wherein the first child device notifies the group information to the parent device; and
consecutively establish direct wireless connections with the at least two child devices of the plurality of child devices,
wherein the group information includes a number that represents a count of child devices to be connected to the parent device.

2. The terminal device according to claim 1,
wherein the CPU is further configured to:
establish the direct wireless connection with a second child device of the plurality of child devices based on a trigger, wherein the second child device lacks a direct wireless connection; and
manage the group information notified from the first child device with which the direct wireless connection has been established.

3. The terminal device according to claim 2,
wherein the CPU is further configured to establish the direct wireless connection with the second child device based on a user operation, on the parent device and the first child device, as the trigger.

4. The terminal device according to claim 2,
wherein the CPU is further configured to notify the group information managed based on the direct wireless connection, as an object for connection.

5. The terminal device according to claim 2,
wherein the group information comprises at least one of Device Name, Model Name, or Serial Number.

6. The terminal device according to claim 2,
wherein the group information is notified in one of the Probe Request, Probe Response, or Beacon Frame.

7. The terminal device according to claim 1, wherein the CPU is further configured to periodically transmit the probe request, to search the at least two child devices, for the time period.

8. A communication method, comprising:
in a terminal device:
transmitting a probe request, to search at least two child devices of a plurality of child devices, for a time period,
wherein the plurality of child devices and the terminal device that operates as a parent device communicate by wireless communication;
managing group information representing a group, wherein the group comprises the at least two child devices to which a child device belongs;
establishing a direct wireless connection with the child device, wherein the child device notifies the group information to the parent device; and consecutively establishing direct wireless connections with the at least two child devices of the plurality of child devices, wherein the group information includes a number that represents a count of child devices to be connected to the parent device.

9. A non-transitory computer-readable medium having stored thereon, computer-executable instructions causing a computer operating as a parent device to execute operations, the operations comprising:

transmitting a probe request, to search at least two child devices of a plurality of child devices, for a time period, wherein the plurality of child devices and the parent device communicate by wireless communication;

managing group information representing a group, wherein the group comprises the at least two child devices to which a child device belongs;

establishing a direct wireless connection with the child device, wherein the child device notifies the group information to the parent device; and consecutively establishing direct connections with the at least two child devices of the plurality of child devices, wherein the group information includes a number that represents a count of child devices to be connected to the parent device.

10. A terminal device, comprising:

a central processing unit (CPU) configured to:

receive a probe request, to search a child device of a plurality of child devices, from a parent device for a time period, wherein the terminal device operates as the child device, and wherein the parent device and the plurality of child devices communicate by wireless communication;

transmit a probe response to the parent device based on the received probe request;

notify the parent device by first group information representing a group, wherein the group comprises at least two child devices of the plurality of child devices, to which the child device belongs; and establish a direct wireless connection with the parent device based on a trigger, wherein the first group information includes a number that represents a count of child devices to be connected to the parent device.

11. The terminal device according to claim 10, wherein the CPU is further configured to establish the direct wireless connection with the parent device based on a user operation, on the parent device and the child device, as the trigger.

12. The terminal device according to claim 10, wherein the CPU is further configured to establish the direct wireless connection with the parent device, based on second group information notified from the parent device as an object of connection, wherein the second group information matches the first group information representing the group to which the child device belongs.

13. The terminal device according to claim 10, wherein the first group information is user-changeable.

14. A communication method, comprising:

in a terminal device:

receiving a probe request, to search a child device of a plurality of child devices, from a parent device for a time period, wherein the terminal device operates as the child device, and wherein the parent device and the plurality of child devices communicate by wireless communication;

transmitting a probe response to the parent device based on the received probe request;

notifying the parent device by group information representing a group, wherein the group comprises at least two child devices of the plurality of child devices, to which the child device belongs; and establishing a direct wireless connection with the parent device based on a trigger, wherein the group information includes a number that represents a count of child devices to be connected to the parent device.

15. A non-transitory computer-readable medium having stored thereon, computer-executable instructions causing a computer operating as a child device to execute operations, the operations comprising:

receiving a probe request, to search the child device of a plurality of child devices, from a parent device for a time period, wherein the plurality of child devices and the parent device communicate by wireless communication;

transmitting a probe response to the parent device based on the received probe request;

notifying the parent device by group information representing a group, wherein the group comprises at least two child devices of the plurality of child devices, to which the child device belongs; and establishing a direct wireless connection with the parent device based on a trigger, wherein the group information includes a number that represents a count of child devices to be connected to the parent device.

16. A communication system, comprising:

a parent device comprising a first central processing unit (CPU) configured to:

transmit a probe request, to search at least two child devices of a plurality of child devices, for a time period, wherein the parent device and the plurality of child devices communicate by wireless communication;

manage group information representing a group, wherein the group comprises the at least two child devices to which a first child device belongs, establish a direct wireless connection with the first child device which is configured to notify the group information; and consecutively establish direct wireless connections with the at least two child devices of the plurality of child devices; and the child device comprising a second central processing unit (CPU) configured to:

receive the probe request from the parent device, transmit a probe response to the parent device based on the received probe request, notify the group information to the parent device, and establish the direct wireless connection with the parent device based on a trigger, wherein the group information includes a number that represents a count of child devices to be connected to the parent device.

* * * * *